April 21, 1964  L. S. LEWIS ETAL  3,130,078
MASKING PRODUCTS FOR AUTOMOTIVE VEHICLES BEING SPRAY PAINTED
Filed Oct. 31, 1961  2 Sheets-Sheet 1
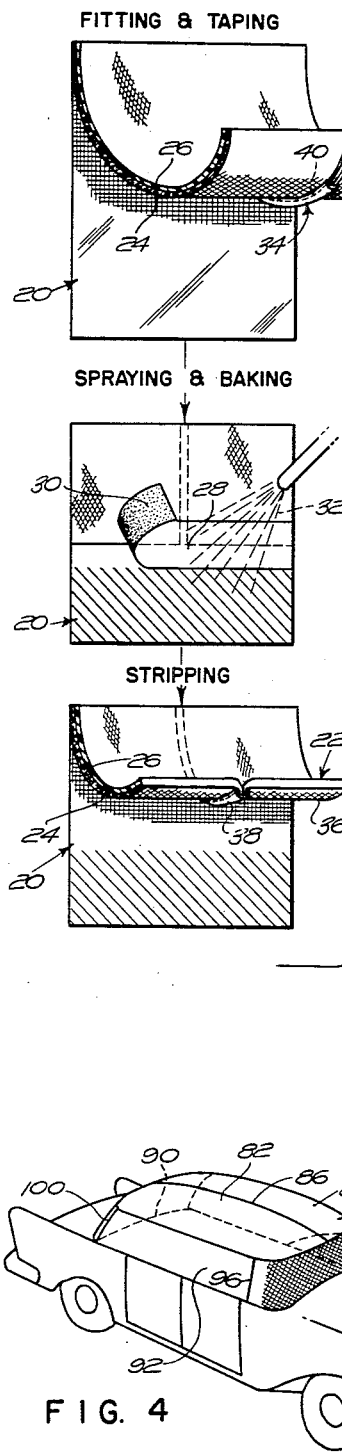
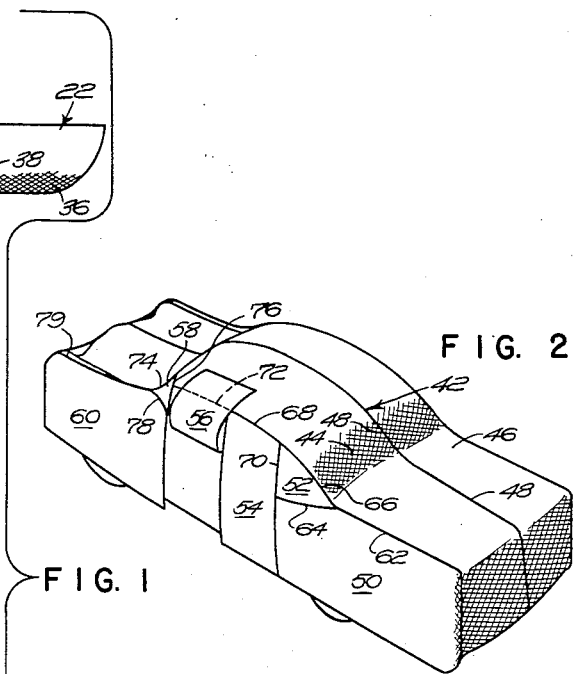
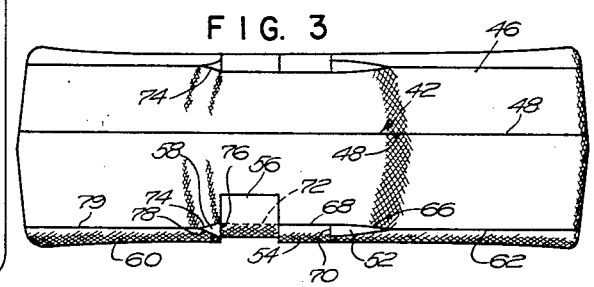
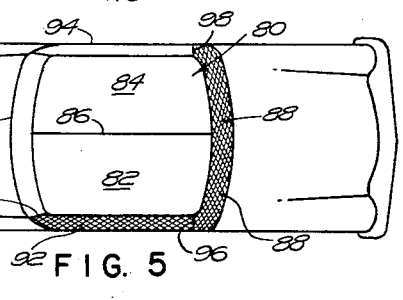
INVENTORS
Louis S. Lewis &
BY Irving Cooper
Morse & Altman

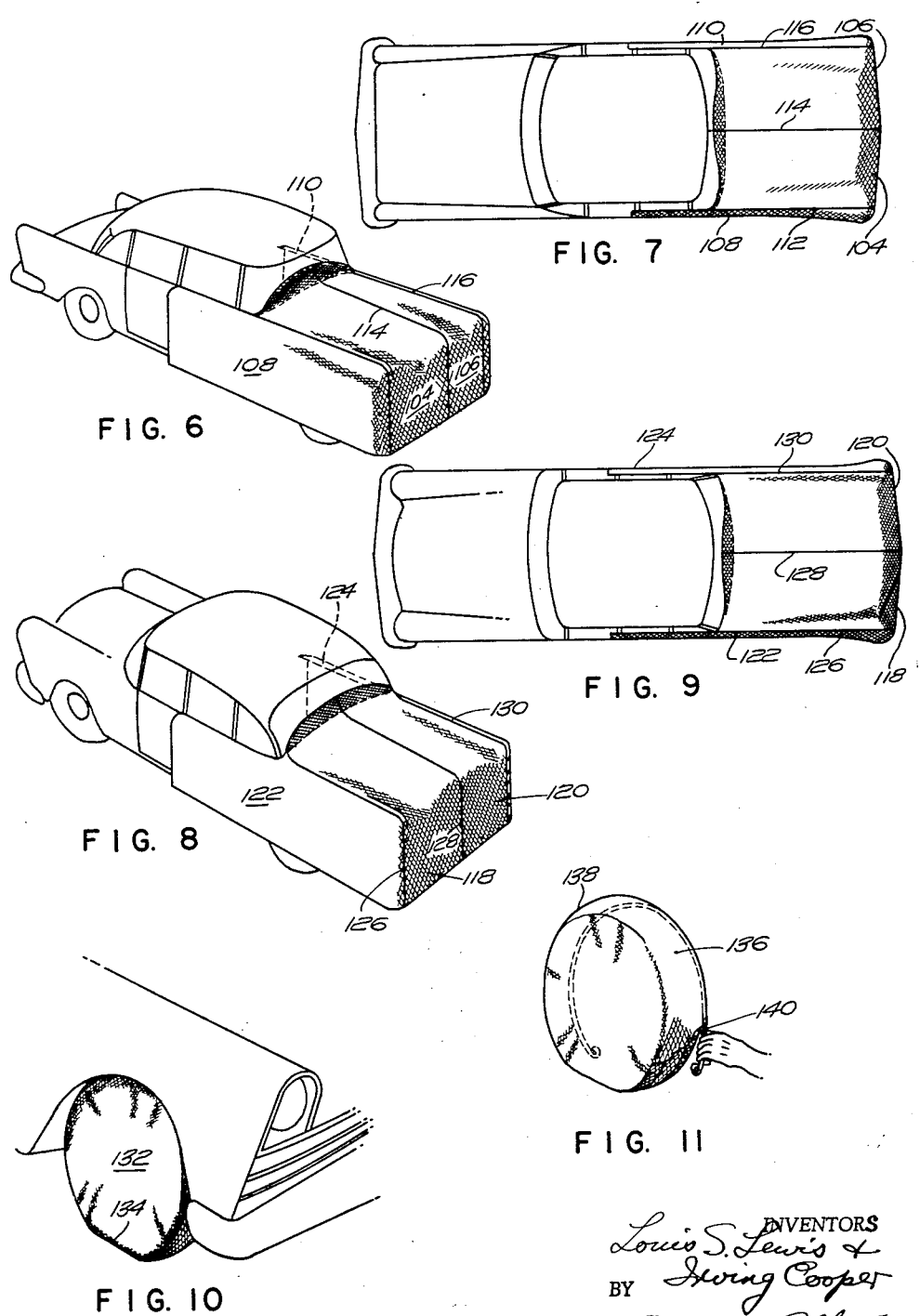

3,130,078
Patented Apr. 21, 1964

3,130,078
MASKING PRODUCTS FOR AUTOMOTIVE VEHICLES BEING SPRAY PAINTED

Louis S. Lewis, Winthrop, and Irving Cooper, Marblehead, Mass., assignors to Marson Corporation, Revere, Mass., a corporation of Massachusetts
Filed Oct. 31, 1961, Ser. No. 149,016
2 Claims. (Cl. 118—505)

The present invention relates to products that involve masking portions of automotive vehicles while painting remaining portions thereof and, more particularly, to automotive painting and paint "maskers" useful therein, the masking products possessing unprecedented utility and versatility by virtue of a novel association of structural design and material selection.

Objects of the present invention are: to provide automotive maskers possessing the foregoing characteristics, by virtue of a construction comprising at most relatively few discrete sections, joined to each other by more or less continuous rows of simple stitching to conform roughly to at least a portion of an automotive vehicle, and each section composed of a fabric externally coated with a silicone resin, in which is dispersed a radiation reflective pigment, particularly aluminum.

Other objects of the present invention will in part be obvious and will in part appear hereinafter.

The invention accordingly comprises the product possessing the features, properties and the relation of components, which are exemplified in the following detailed disclosure and the scope of which will be indicated in the claims.

For a fuller understanding of the nature and objects of the invention, reference should be had to the following detailed description taken in connection with the accompanying drawings wherein:

FIGURE 1 is a flow chart of a process exemplifying the present invention;

FIG. 2 is a perspective view of a preferred masker, fitted to an automotive vehicle in accordance with the present invention;

FIG. 3 is a top plan view of the masker of FIG. 2;

FIG. 4 is a perspective view of another masker fitted to the corresponding part of an automotive vehicle in accordance with the present invention;

FIG. 5 is a top plan view of the masker of FIG. 4;

FIG. 6 is a perspective view of a further masker fitted to the corresponding part of an automotive vehicle in accordance with the present invention;

FIG. 7 is a top plan view of the masker of FIG. 6;

FIG. 8 is a perspective view of still another masker fitted to the corresponding part of an automotive vehicle in accordance with the present invention;

FIG. 9 is a top plan view of the masker of FIG. 8;

FIG. 10 is a perspective view of still a further masker fitted to the corresponding part of an automotive vehicle in accordance with the present invention; and FIG. 11 is a broken-away, perspective view, illustrating the construction of the masker of FIG. 10.

Generally, the process specifically disclosed in FIG. 1 as illustrative of the present invention involves the following steps. First, part of an automotive vehicle 20 is covered by a masker 22 constructed from sections of a textile fabric 24 externally coated at 26 with a silicone resin in which is dispersed a radiation reflective pigment, preferably aluminum powder. Next, the edges of the masker are taped to contiguous portions of the automotive vehicle by means of a strip 28 having a pressure sensitive adhesive 30 on its inner face. Next, automotive paint 32 is sprayed upon these contiguous portions. Then, these contiguous portions are baked, while masker 22 is retained in fitted position upon the automotive vehicle. Finally masker 22 is removed from automotive vehicle 20. Although baking the contiguous portions while retaining the masker in place is a step of the preferred process, it is to be understood that maskers of the present invention may be used in conventional fashion merely to shield portions of the automotive vehicle from paint being sprayed.

For best results, the material from which the maskers are constructed comprise a cotton cloth having from 50 to 60 warp threads and from 47 to 57 filling threads per square inch and weighing from 0.1 to 0.2 pounds per square yard. The outer face of this material is coated with a thin layer, of the order of approximately .001 inch thick, of a silicone resin containing dispersed therein from 10 to 25% by total weight of powdered aluminum. Generally, such silicone resins are organopolysiloxanes including such materials as silcarbanes and silazanes, as well as silicone-alkyd and silicone-phenolic resins. Typically these silicones are produced from organosilicon halide intermediataes by the direct method, the Grignard method or the olefin method. Preferably, tape 28 is composed of disposible paper and its pressure sensitive adhesive coating is composed of a heat resistant silicone adhesive. The paint with which the automotive vehicle is sprayed is a conventional enamel or lacquer.

Discrete sections of the masker, as shown at 34 and 36, are bound at their registered and superposed edges, by the overlapping longitudinally extending sections a folded tape 38. The overlapping edges of the folded tape and the registered edges of the sections therebetween are sewn together by simple chain stitching 40. The tape, preferably composed of a plastic, assures that the seam is impermeable to the paint sprayed upon it. Generally, the baking step is effected, for example by infrared illumination, at a temperature ranging from 150 to 250° for a period ranging from a few minutes to an hour. The construction of the masker is such as to retain paint that becomes caked upon it in order to avoid its flaking off and its adhering to the paint before it is dried. The weight and stiffness of the material of which the masker is composed renders it convenient for manual fitting to a portion of the automotive vehicle. This material is woven so as to be of high tensile strength and to provide a porous surface to which any automotive paint will adhere notwithstanding its physical-chemical incompatibility with the silicone coating. The paint may be easily removed by dipping the masker in a solution of an organic solvent for the paint but not for the silicone coating.

The masker of FIGS. 2 and 3, generally designated by 42 comprises two continuous longitudinal sections 44 and 46 joined by a seam 48 extending from the rear trunk, over the roof and front hood of an automobile. Adjoining each other in sequence along the free edge of section 44 are a rear fender section 50, a rear triangular junction section 52, a rear medial flap 54, a forward medial flap 56, a forward triangular junction section 58 and a front fender section 60. It will be observed that rear fender section 50 is joined to longitudinal section 44 throughout its rear and upper edges by a seam 62 and is joined to the lower edge of triangular junction 52 by a seam 64. Rear triangular junction 52 is joined to longitudinal section 44 by a seam 66. Rearward medial flap 54 is joined at its upper edge to longitudinal section 44 by a seam 68 and at its upper rearward edge to triangular junction 52 by a seam 70. Front flap 56 is joined at its upper edge to medial section 44 by a seam 72 and to the rearward edge of front triangular junction section 58 by a seam 76. Front triangular junction section 58 is joined to longitudinal section 44 by seam 74. Front fender section 60 is joined to front triangular junction section 58 by a seam 78 and to medial section 44 along its upper and forward edges by seam 79. The other rear fender section, rear triangular junction section, rear medial flap, front medial flap, front triangular junction section and front fender section are joined to each other and to longitudinal section 46 in like manner. Seams 48, 62, 64, 66, 68, 70, 72, 74, 76, 78 and 79 are of the type described above at 34. The free edges of the various sections are unbound and unhemmed for the purpose of permitting smooth masking operations. This masker, which normally covers the automobile completely from bumper to bumper, is designed so that flaps and other portions thereof may be raised to expose doors, fenders, trunks, hoods, etc. that are to be selectively printed.

FIGS. 4 and 5 illustrate a roof masker 80 comprising a pair of longitudinal sections 82 and 84 joined along their inner edges by a seam 86. Masker 80 further includes forward and rearward panels 88 and 90 and side panels 92 and 94 joined to each other by seams 96, 98, 100, etc. All seams are of the type described above in connection with FIG. 1. Masker 80 which covers the tops of coaches and sedans down to the door panels, is useful for two-tone work when the entire lower section of the car is to be painted.

FIGS. 6 and 7 disclose a lower front masker simply constructed from a pair of medial longitudinal panels 104 and 106 and a pair of side panels 108 and 110, which project rearwardly of the back edge of medial panels 104 and 106. These panels are connected to each other by seams 112, 114, and 116 of the type described above in connection with FIG. 1. This masker covers the hood and front doors of sedans and coaches, extending back to the forward edges of the rear doors and down to the level of the center of the wheels. It will be noted that the back edge of medial panels 104 and 106 is of greater length than is the medial distance between seams 112 and 116, whereby the lower section of the windshield is protected.

FIGS. 8 and 9 disclose a lower rear masker simply constructed from a pair of medial longitudinal panels 118 and 120 and a pair of side panels 122 and 124, which project forwardly of the front edge of medial panels 118 and 120. These panels are connected to each other by seams 126, 128, and 130 of the type described above in connection with FIG. 1. This masker protects the trunk and the rear doors of coaches and sedans, extending forward to the back edge of the front doors and down to the level of the center of the wheels. It will be noted that the length of the front edge of medial sections 118 and 120 is greater than the medial distance between seams 126 and 130.

FIGS. 10 and 11 disclose a wheel masker comprising an outer generally circular panel 132 having a flat lower edge 134, and an inwardly projecting, generally cylindrical portion 136 extending from the periphery of outer panel 132. Outer panel 132 is connected to cylindrical panel 132 by a seam 138. The inner edges of cylindrical portion 136 enclose an arc of spring metal 140 which locks the masker over the wheel to be shielded.

All of the maskers illustrated in FIGS. 3 through 11 have been constructed by way of specific example from sections cut from cotton fabric of plain square weave, 57 inches wide and measuring 4.3 yards per pound, having 56 warp and 52 filler threads per square inch. This cloth was coated at a doctor blade setting of .001 inch with a hydrocarbon solution containing by total weight approximately 35% of a silicone-polyvinyl butyral resin and 15% of powdered aluminum. When dried, this coating combined with the cotton fabric to produce panels having the characteristics described above.

Since certain changes may be made in the above product and process, without departing from the scope of the invention herein involved, it is intended that all matter contained in the above description and shown on the accompanying drawings shall be interpreted in an illustrative and not in a limiting sense.

What is claimed is:

1. A masker to be fitted to a part of an automotive vehicle, said masker comprising panels constituting components of fabric coated with an organo polysiloxane resin in which is dispersed an aluminum powder, said fabric being composed of cotton cloth having from 50 to 60 warp threads and from 47 to 57 filler threads per square inch, said resin containing dispersed therein by total weight of from 10 to 25% aluminum powder, said panels including a pair of generally longitudinal panels, joined along associated longitudinal edges by a seam adapted to extend from the rear trunk over the roof and front hood of said vehicle, and a pair of opposed groups of generally transverse panels in sequence along the remote longitudinal edges of said longitudinal panels, each group including a rear fender section, a rear triangular junction section, a rear medial flap, a forward medial flap, a forward triangular junction section and a front fender section, said rear fender section being joined to one of said remote edges throughout its rear and upper edges by a seam and being joined to the lower edge of said rear triangular junction section by a seam, said rear triangular junction section being joined to said one of said remote edges by a seam, said rearward medial flap being joined at its upper edge to said one of said remote edges by a seam and its upper rearward edge to said rearward triangular junction section by a seam, said front flap being joined at its upper edge to said one of said remote edges by a seam and to the rearward edge of said front triangular junction section by a seam, said front triangular junction section being joined to said one of said remote edges by a seam, said front fender section being joined to said front triangular junction section by a seam and to said one of said remote edges by a seam, whereby at least a selected one of said panels is removable from the remainder of said automotive vehicle without disturbance to other panels of said masker remaining fitted to said automotive vehicle.

2. A masker comprising a first pair of generally coplanar longitudinal sections and a second pair of generally coplanar longitudinal sections, the plane of said first pair and the plane of said second pair being at approximately right angles relative to each other, said sections being composed of a woven fabric externally coated with a layer of silicone resin containing a dispersed heat reflective pigment, said sections being longitudinally joined to each other at adjacent edges by seams so that all panels constitute part of a composite assemblage, plastic strips folded about said seams and stitching through the faces of said folded plastic strips and said seams, said woven fabric being composed of cotton cloth having from 50 to 60 warp threads and from 47 to 57 filler threads per square inch and said resin contains said pigment in an amount by total weight ranging from 10 to 25%.

References Cited in the file of this patent

UNITED STATES PATENTS

| | | |
|---|---|---|
| 1,679,886 | Wright | Aug. 7, 1928 |
| 1,719,055 | Herzer | July 2, 1929 |
| 1,726,744 | Krug | Sept. 3, 1929 |
| 2,630,573 | Rand | Mar. 10, 1953 |
| 2,919,218 | Le May | Dec. 29, 1959 |